Oct. 24, 1967
J. A. GILLIAM
3,348,330
MINNOW BUCKET
Filed June 10, 1965
2 Sheets-Sheet 1
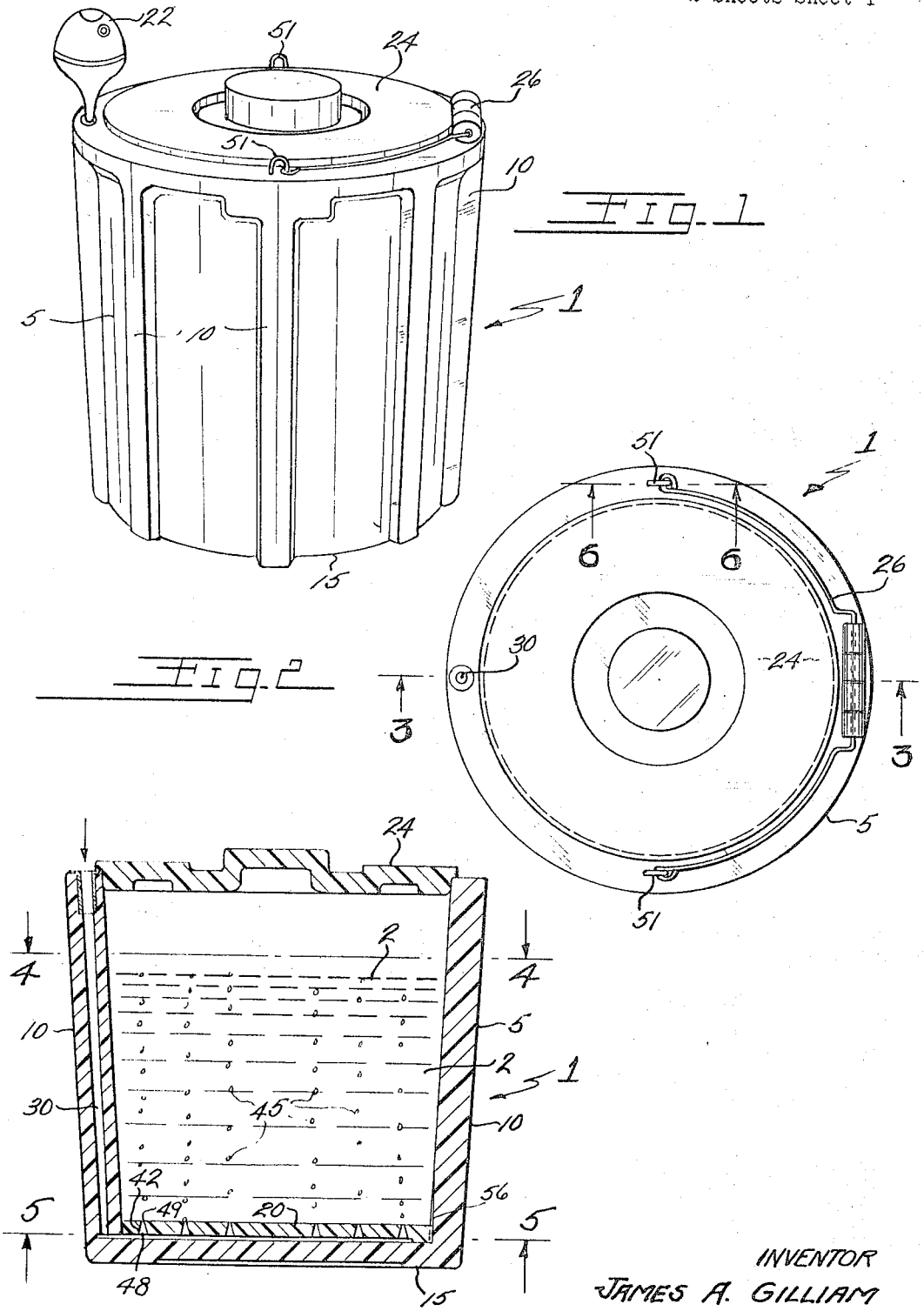
INVENTOR
JAMES A. GILLIAM
BY
Meyer, Baldwin, Doran & Egan
ATTORNEYS

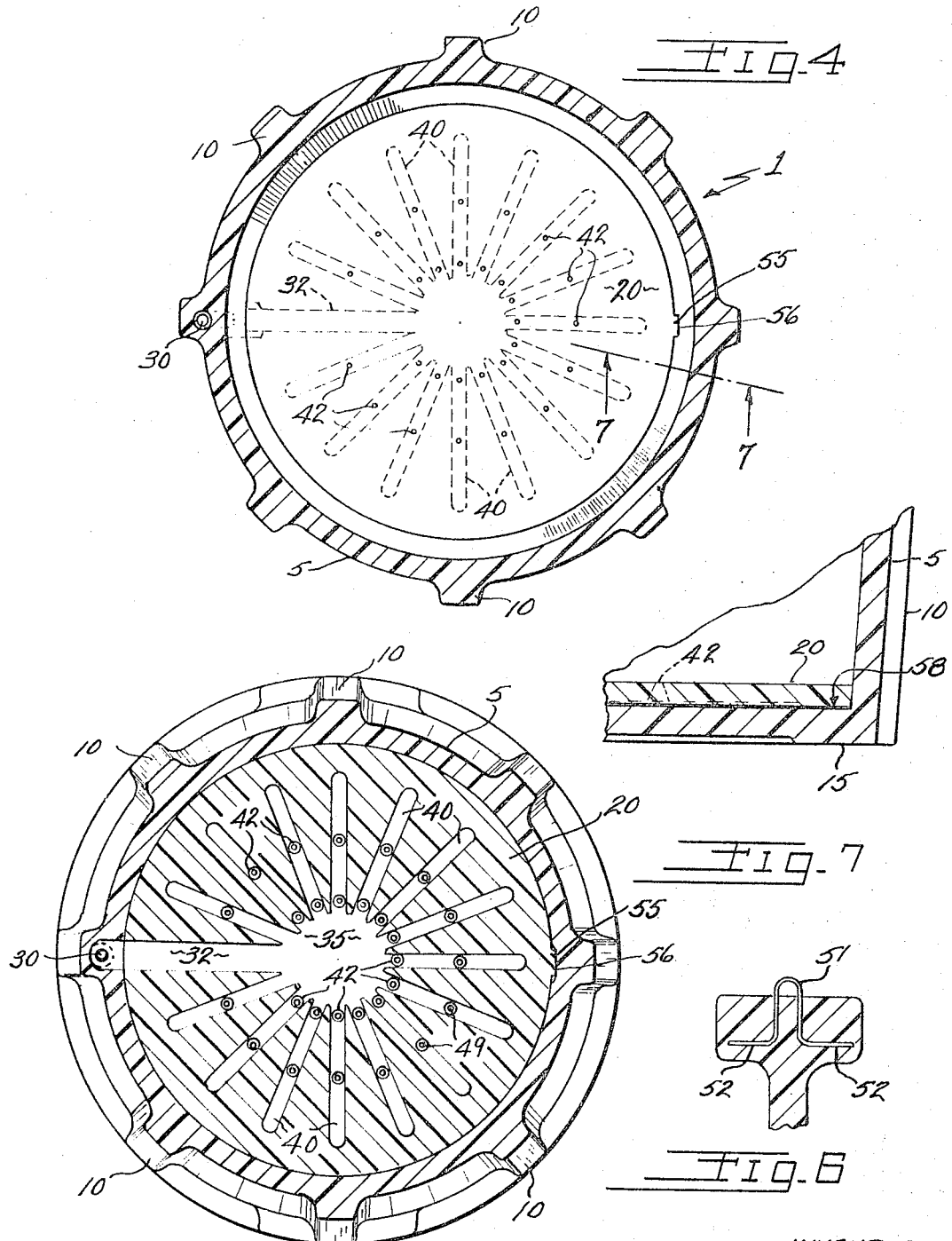

United States Patent Office 3,348,330
Patented Oct. 24, 1967

3,348,330
MINNOW BUCKET
James A. Gilliam, Cleveland, Ohio, assignor to Gil-Boy Enterprises, Inc., Cleveland, Ohio, a corporation of Ohio
Filed June 10, 1965, Ser. No. 462,965
1 Claim. (Cl. 43—57)

ABSTRACT OF THE DISCLOSURE

A minnow bucket for use in keeping fish bait and the like alive for sustained periods. The bucket is formed with a bottom and an upstanding integrally formed generally tubular side wall to define a chamber for holding water and like liquid into which the fish bait is disposed. The bucket has a false bottom which, in turn, is formed with air passageways communicating with passageways formed in the side wall of the bucket whereby air may be pumped therethrough and into the bottom of the bucket so as to aerate the water and thereby provide adequate oxygen to sustain the life of the fish bait therein.

---

The present invention relates to buckets adapted for keeping minnows alive in water and more particularly relates to a bucket having means for supplying fresh air to the interior of the bucket that is very effective in keeping the minnows alive for long periods of time.

As is well known to fishermen, often a large majority of fish or minnows that are transported for fishing are dead when it is desired to use them after an automobile trip, boat ride or extended period of fishing. One of the main reasons for the loss of the minnows is that there is a lack of oxygen in the water.

It is an object of the present invention to provide a bucket adapted for keeping minnows alive in water by supplying fresh air or other life-sustaining fluid to the contained water employing an economical, simply constructed, yet excellent dispersing system for supplying fresh air to the water contained in the bucket.

It is an object of the present invention to provide a minnow bucket that is made of foamed plastic that is light, strong, has insulating properties, and has air distributing means that can quickly and economically supply fresh air evenly and uniformly from the bottom of bucket into the water contained therein.

It is an object of the present invention to provide a foamed polystyrene plastic bucket having a plurality of reinforcing ribs spaced circumferentially around the outer periphery of the side wall, one of the reinforcing ribs being hollow to provide a passageway for supplying fresh air by means of an aspirator bulb into a central air distributing means provided in the bottom of the bucket, the air distributing means including a central hub and a plurality of spokes radiating therefrom in which each spoke has at least one aeration opening communicating with said spoke and the interior of the bucket for uniformly aerating the water contained therein.

These and other objects will be apparent from the specification that follows, the appended claim and the drawings in which—

FIG. 1 is a front perspective view of a minnow bucket embodying the present invention with a lid in place and an aspirator bulb mounted thereon for supplying fresh air to the interior of the bucket;

FIG. 2 is a top plan view of the minnow bucket of FIG. 1 with the aspirator bulb removed;

FIG. 3 is an elevational sectional view of the bucket of FIG. 2 taken along the line 3—3 indicated in FIG. 2;

FIG. 4 is a sectional view taken along the line 4—4 indicated in FIG. 3;

FIG. 5 is a sectional view taken along the line 5—5 indicated in FIG. 3;

FIG. 6 is a sectional view taken along the line 6—6 indicated in FIG. 2; and

FIG. 7 is a sectional view taken along the line 7—7 indicated in FIG. 4.

The present invention provides a bucket especially adapted to keep minnows healthy and alive by providing for said bucket, means for economically and uniformly distributing fresh air to the interior of the bucket to thereby deliver life-sustaining oxygen to the minnows, the means including a hollow reinforcing rib on the side wall of said bucket through which air is forced from the outside by an aspirator bulb to a central air distributing means on the bottom of the bucket, the distributing means including a central hub and a plurality of spokes radiating therefrom wherein each spoke has at least one opening associated therewith that is effective to deliver air to the water contained in said bucket.

As best seen in FIG. 1, the minnow bucket 1 of the present invention includes a generally circular bottom 15 integrally formed with an upstanding side wall 5 shown to be somewhat frusto-conical in configuration and having a plurality of vertical extending ribs 10 preferably disposed in equal spaced relation circumferentially around the outside of said side wall. A false bottom in the form of a circular plate 20 is disposed within the chamber of the bucket 1 adapted to engage the bottom 15 as best seen in FIGS. 3 and 7. As also seen, for instance, in FIG. 1, an aspirator bulb 22 and a lid 24, and a handle 26 are provided for the novel bucket in which minnows can be kept healthy and alive. Not only does the present invention enable more fish to be caught by providing livelier bait, which is highly desirable, but it also reduces the fisherman's minnow cost as much as fifty percent.

As seen in FIGS. 3 and 4, one of the reinforcing ribs 10 is hollow and contains therein a passageway 30 through which air is forced by the aspirator bulb 22. The aspirator bulb 22 as seen in FIG. 1 is inserted into the upper end of passageway 30 so as to be operable to force air downwardly therethrough.

As best seen in FIGS. 3 and 5 false bottom 20 is formed with a passage 32 which extends radially therethrough to communicate at its outer end with passageway 30 and at its inner end with a central hub or cavity 35. A plurality of radially extending channels 40 are formed in said false bottom 20 opening at one end into cavity 35.

A plurality of openings or ports 42 are formed in said false bottom connecting at one end with one of said channels 40 and opening at the opposite end with the interior chamber of the bucket 1.

The aeration of the water 2 as depicted in said bucket chamber may thus be accomplished as illustrated diagrammatically by air bubbles 45 by forcing air downwardly through passage 30, passage 32, channels 40 and communicating ports 42 into said bucket chamber.

As best seen in FIG. 3, each of the small openings 42 preferably has a larger cross-sectional area at the bottom 48 than at the top 49 to provide for more efficient and uniform aeration of the water 2. The cross sectional area of the opening 42 at the base 48 nearest the bottom of the bucket is preferably about the size of the passageway 30 in said rib while the cross sectional area of the top 49 is only about ⅓ to ½ that of the bottom 48.

In the preferred embodiment shown in the drawings, it can be seen that 15 channels radiate outwardly from the hub in a plane generally parallel to that of the bottom of the bucket and that the majority of said channels have at least two air openings 42 each of the dispersal of life-sustaining air to the fish. Also, at best seen in FIGS. 4 and 5, the passageway 32 is preferably larger in cross section than any one of the channels 40 for more efficient distribution of the air pumped through the air distributing means by the aspirator bulb. It has been found that by distributing the air holes 42 so their outline forms two generally concentric circles around the center of the false bottom 20, a highly advantageous uniform distribution of the air into the water 2 is obtained, and consequently there is a reduction of minnow cost to the fisherman of nearly fifty percent.

As shown in FIG. 6, the top of the side wall 10 is provided with a pair of eyes 51 for securing the handle 26 to the bucket, each of the eyes being formed by short lengths of wire having a central U-shaped section which forms the eye and a lateral side 52 on each side of the eye section, the sides being embedded in the plastic container.

As seen for instance, in FIGS. 4 and 5, the periphery of the false bottom 20 is preferably provided with a projection 55 which registers with the notch 56 in the side wall 5 to position and secure the false bottom simply and conveniently over the bottom 15 of the bucket. This projection 55 is conveniently located opposite the air passageway 32 that connects the side wall passageway 30 and the central hub 35 to facilitate quick assembly of the bucket. The false bottom can be quickly assembled and cemented into place by suitable waterproof adhesive layer 58 as best seen in FIG. 7.

The novel bucket of the present invention is preferably made of a rigid foamed plastic material that is hard and impervious to water as well as strong and durable. The best results have been obtained by the use of foamed polystyrene as the material for the bucket and the false bottom.

The foam plastic must be rigid enough to support the weight of the water and rough handling with the minimum of the reinforcing ribs around the side wall. It has been found that from about eight to ten ribs around the side wall are preferred, each of the ribs being approximately 1½ to 2 times the normal thickness of the side wall. Likewise, the cross sectional area of the passageway 30 of the hollow rib is preferably approximately ⅛ to ½ of the cross sectional area of said rib.

It is to be understood that the invention here involved is not limited to the structural details or arrangements of parts shown in the preferred embodiment illustrated in the drawings, inasmuch as the present invention may take various forms. Thus, the terminology herein applied is for the purpose of description and not limitation since the scope of the present invention is denoted by the appended claim.

What is claimed is:

A bucket adapted for keeping minnows alive, the bucket comprising a bottom wall and a side wall integrally formed therewith and generally frusto-conical in elevation to define a chamber for the disposition of water, a false bottom disposed in said chamber and engaging said bottom wall, a plurality of reinforcing ribs spaced circumferentially around and formed integrally with said side wall, means forming a passageway in one of said ribs for transporting fresh air to the bucket chamber, said passageway opening at one end to the top of said side wall and at the opposite end to the bucket chamber below a top portion of said false bottom, air distributing means provided in said false bottom comprising means forming a central cavity and a plurality of channels formed in the underside of said false bottom extending radially and communicating at the inner end thereof to said central cavity, means defining an air passage in said false bottom connecting said passageway formed in the rib and said central cavity, means defining a plurality of ports formed in said false bottom which communicate with said channels and said bucket chamber to provide for the passage of air from said air distributing means to said chamber, said ports being evenly distributed along said channels so as to provide a uniform distribution of air to the water in said chamber, said passage in said false bottom being generally larger in capacity than any one of said channels, each of said ports provided in the false bottom having a larger cross-sectional area at its lower end communicating with its associated channel.

References Cited
UNITED STATES PATENTS

| | | | |
|---|---|---|---|
| 2,560,672 | 7/1951 | Volenec et al. | 43—57 |
| 2,731,760 | 1/1956 | Ebert | 43—57 |
| 2,767,508 | 10/1956 | Kiember | 43—56 |
| 2,767,509 | 10/1956 | Breithaupt | 43—57 |
| 2,863,255 | 12/1958 | Slipka | 43—57 |

SAMUEL KOREN, *Primary Examiner.*

HUGH R. CHAMBLEE, *Examiner.*